2,785,136
BRIQUETS FOR DESALTING SEAWATER

Augustine L. Colarusso, Boston, Mass., assignor to Van Brode Milling Co., Inc., Clinton, Mass., a corporation of Massachusetts No Drawing. Application February 18, 1954,
Serial No. 411,253

1 Claim. (Cl. 252—179)

The present invention relates to chemicals for desalting seawater, and more specifically to a mixture of such chemicals in the form of a briquet.

The World War brought into prominence the problem of providing water for those stranded at sea in life rafts or life boats. Various chemicals and devices have been proposed for desalting seawater and possibly the most satisfactory is the employment of a silver alumino silicate cation exchanger which, together with other ingredients, is capable of readily desalting seawater to a degree sufficient to render it potable. Since the space provided on any emergency equipment is rather limited, the silver alumino silicate cation exchangers utilized for this purpose should, of course, have a maximum capacity per unit of weight and the volume should be held down to a minimum, especially in those kits which are to be carried by aviators.

One special chemical kit, for the purpose stated, which has been used with success comprises the desalting chemicals in the form of briquets and a plastic bag of special construction. The bag includes a built-in filter, through which the desalted water is passed to an outlet. In use, a measured quantity of seawater is put into the bag with a briquet of the chemicals. The bag is then agitated for a sufficient time to produce disruption of the briquet and reaction of the chemicals with the salts, etc., in the seawater. When the reaction has taken place, the treated water is sucked out of the bag through the filter and outlet.

The briquet contains, in addition to the silver alumino silicate cation exchanger (synthetic silver zeolite), small quantities of other materials, for instance, a small amount of barium hydrate for the purpose of reducing the sulfate content of the seawater to be treated; a small amount of silver oxide to cause precipitation or fixing of the magnesium in the water; a small amount of activated carbon to improve the odor and taste of the treated water; and a small amount of a lubricant, such as stearic acid, to facilitate briqueting.

Pressures of the order of 5 to 20 tons per square inch, or even higher, are used in forming the briquets. However, by using the higher pressure ranges, difficulties have been experienced in breaking up the briquets for the utilization of the maximum capacities of the reactive materials. The reason for this is that, when the silver cation exchanger and the other ingredients necessary to render seawater potable are compressed under the above-mentioned relatively high pressures, the resulting briquet does not disintegrate easily when placed in seawater, so that a materially limited efficiency results. To obviate this difficulty, it has been proposed to include in the briquets disruptor materials, such as fuller's earth, or bentonite, or wilkinite, but these materials not only considerably increase the volume and weight of the briquet, but have also a tendency to clog or partially block the filter through which the treated water is to be drawn off and, thus, increase the time required for filtering. Another material that has been suggested as a disruptor is a silver cation exchange resin. The advantage claimed for the last-mentioned disruptor is that it produces a superior and quicker disruption of the briquet than fuller's earth, bentonite and wilkinite, and that it is an active desalting ingredient, contributing to the desired desalting. While this may be so, it should be noted, that the silver cation exchange resin is obtained by converting a plastic resin copolymer to the silver exchange condition, which is a rather complicated and costly procedure.

One of the objects of the present invention is to provide a briquet including, in addition to the inorganic silver zeolite, a cation exchange resin which, because of its low density, may be used in sufficient volumes to produce desalting briquets which are disrupted quicker and easier when placed in seawater than by the use of the heavier silver cation exchange resins.

Another object of the invention is to provide a briquet including, in addition to the silver zeolite, an amount of silver oxide which is greater than that required for causing precipitation or fixing of the magnesium in the water, and a hydrogen cation exchange resin, the latter not only acting as a disruptor but serving also to pick up sodium ions which are liberated by the silver oxide reaction on the water, so that the excess silver may react with sodium chloride in the water.

Other objects and advantages of the invention will appear more fully hereinafter.

In accordance with the present invention, a compact briquet containing an ion exchanger is provided which disintegrates quickly and readily when contacted with water. In the specific embodiment of this invention, the briquets for desalting seawater, comprising a silver alumino silicate cation exchanger and other ingredients, are relatively easily disintegrated when placed into seawater, the constituents of the briquets being thus enabled rapidly to react with the sodium chloride and other salts in the water, to form insoluble products and thus render the filtered seawater potable.

The improved seawater desalting briquet contains a silver cation exchange material, such as a synthetic silver alumino silicate, as its principal active reagent, in addition to small amounts of barium hydrate, silver oxide, activated carbon, a lubricant and a disruptor, all in a finely divided state.

The method of preparing synthetic silver alumino silicates is well known in the art and their capacity for the removal of chlorides from seawater is fully understood, so that a further detailed description thereof seems to be unnecessary.

Also, those familiar with the chemistry of desalting seawater know that in practically all seawater desalting compositions:

1. A small amount of barium hydrate is employed in order to reduce the sulfate content of the seawater being treated;
2. A small amount of silver oxide has been added to cause precipitation or fixing of the magnesium in the water;
3. A small amount of activated carbon has also been employed to improve the odor and taste of the treated water;
4. A lubricant, such as stearic acid, has also been used in a small quantity to facilitate briqueting; and
5. A small amount of a disruptor is employed to facilitate breaking up of the briquet in the water.

In accordance with the present invention, a suitable quantity of hydrogen cation exchange resin is used as a disruptor, for instance, a polystyrene cation exchange resin known in the trade as "Chempro C-20 in hydrogen form," produced by Chemical Process Co., of Redwood City, California. This material is of substantially lower density than the silver cation exchange resins heretofore employed as disruptors, the ratio of density between the latter and the hydrogen cation exchange resin being about 1.44 to 1, so that, obviously, a correspondingly larger volume of the hydrogen cation exchange resin may be incorporated in a briquet without exceeding the required weight limit of the briquet to be produced. Consequently, on an equal weight basis, a more rapid disruption of the briquet is effected when making use of the hydrogen cation exchange resin disruptor. The hydrogen cation exchange resin known in the trade as "Chempro C–20 in hydrogen form" is a styrene-divinyl benzene copolymer sulfonic acid. Being sulfonic, its hydrogen ion is most readily replaced. Its structural formula is as follows:

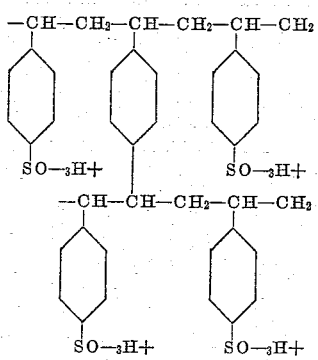

The material herein employed as a disruptor has, among others, an additional function based on its ability to pick up sodium ions which are liberated by the reaction of the silver oxide on the seawater. For this reason, it is possible to increase the amount of silver oxide in the mixture beyond that required for its intended function, that is, to cause precipitation or fixing of the magnesium in the water, without material change of the desired pH of the treated water. The excess silver reacts with the sodium chloride of the seawater, thus increasing the chloride removing action of the silver alumino silicate cation exchanger of the briquet. In other words, the employment of the hydrogen cation exchange resin material as a disruptor is advantageous because its chemical properties actually produce superior and quicker disruption, weight for weight, compared with the silver cation exchange resins heretofore employed, and, in addition, it serves as a means for pH control. Moreover, the hydrogen cation exchange resin, having a great affinity for toxic ion barium, minimizes the possibility of the presence of toxic concentration of barium in the treated water. Of course, the silver cation exchange resin heretofore employed as a disruptor is an active desalting ingredient itself, supplementing the action of the inorganic silver zeolite. However, the silver cation exchange resin is obtained by converting a plastic resin copolymer to silver exchanging condition, which is a rather complicated and expensive procedure. In the briquet produced in accordance with the present application, the silver, contributing to the desalting action of the inorganic silver zeolite, is added to the mixture as a silver oxide, which is a commercial product. Moreover, the silver oxide content of a briquet containing a silver cation exchange resin as a disruptor cannot be increased beyond the amount needed to cause precipitation of the magnesium in the water without danger of exceeding the allowable limit of the pH of the treated water.

Graphite is, preferably, used as a lubricant in the improved compound, to facilitate briqueting, although any other suitable material may be employed for this purpose.

The government specification for the manufacture of desalting kits set the weight of an individual briquet around 74 grams. Having this and other requirements in mind, a briquet was prepared and found satisfactory containing the following ingredients in the following amounts:

| | Grams |
|---|---|
| Silver alumino silicate | 68.1 |
| Hydrogen cation exchange resin | 2.4 |
| Barium hydrate | 2.1 |
| Silver oxide | 1.7 |
| Activated carbon | 0.192 |
| Graphite | 0.800 |
| Total | 75.292 |

In percentages of its component parts, in round figures, the briquet consists thus of approximately: 90% of inorganic silver zeolite, 3% of styrene-divinyl benzene copolymer sulfonic acid, 3% of barium hydrate, 2.5% of silver oxide, 0.3% of activated carbon, and 1% of graphite.

These proportions, of course, may be varied according to the requirements without departing from the invention, which lies mainly in the employment of a hydrogen cation exchange resin disruptor which may be used in volumes greater than the silver cation exchange resin heretofore employed for this purpose, and in the use of silver oxide in quantities to supplement the desalting action of the inorganic silver zeolite.

What I claim is:

A compressed briquet of finely divided chemicals for desalting seawater, consisting essentially of approximately 90% of inorganic silver zeolite, approximately 3% of styrene-divinyl benzene copolymer sulfonic acid in hydrogen form, approximatey 3% of barium hydrate, approximately 2.5% of silver oxide, approximately 0.3% of activated carbon, and approximately 1% of graphite, all of said percentages being by weight.

References Cited in the file of this patent

UNITED STATES PATENTS 2,600,719  Wood _____ June 17, 1952

FOREIGN PATENTS 673,586  Great Britain _____ June 11, 1952